(12) United States Patent
Elvey-Toombs

(10) Patent No.: US 11,214,290 B1
(45) Date of Patent: Jan. 4, 2022

(54) SHOPPING CART ASSEMBLY

(71) Applicant: Janet Elvey-Toombs, Syracuse, NY (US)

(72) Inventor: Janet Elvey-Toombs, Syracuse, NY (US)

(*) Notice: Subject to any disclaimer, the term of this patent is extended or adjusted under 35 U.S.C. 154(b) by 0 days.

(21) Appl. No.: 17/072,139

(22) Filed: Oct. 16, 2020

(51) Int. Cl.
*B62B 3/14* (2006.01)

(52) U.S. Cl.
CPC ............ *B62B 3/1468* (2013.01); *B62B 3/148* (2013.01); *B62B 2203/04* (2013.01); *B62B 2203/071* (2013.01); *B62B 2203/70* (2013.01)

(58) Field of Classification Search
CPC ... B62B 3/1468; B62B 3/148; B62B 2203/04; B62B 2203/071; B62B 2203/70; B62B 3/08; B62B 2203/07; B62B 2203/073; B62B 2203/74
See application file for complete search history.

(56) References Cited

U.S. PATENT DOCUMENTS

| | | | |
|---|---|---|---|
| 3,306,398 A | 2/1967 | Lachance | |
| 3,335,818 A * | 8/1967 | Thompson | B62B 3/1484 186/63 |
| 3,513,944 A | 5/1970 | McConnaughhay | |
| 3,782,569 A | 1/1974 | Montgomery | |
| 3,815,932 A * | 6/1974 | Ruger | B62B 3/1484 280/33.995 |
| 4,373,611 A * | 2/1983 | Frederick | A47F 9/045 186/64 |
| 4,560,180 A * | 12/1985 | Ulmer | B62B 3/1484 280/33.993 |
| 4,771,840 A | 9/1988 | Keller | |
| 5,074,570 A * | 12/1991 | Ferris | B62B 5/0006 280/33.995 |
| 5,320,475 A * | 6/1994 | Pinder | B62B 1/08 414/343 |
| 5,388,667 A | 2/1995 | Sonnendorfer | |
| 6,742,790 B2 | 6/2004 | Seagraves | |
| D493,594 S | 7/2004 | Prather | |
| 7,188,847 B1 * | 3/2007 | Friedman | B62B 3/006 280/47.19 |
| 2016/0257494 A1 * | 9/2016 | Kytomaki | B42D 3/18 |
| 2017/0129377 A1 * | 5/2017 | Barbagallo | B62B 5/00 |

FOREIGN PATENT DOCUMENTS

| | | | | |
|---|---|---|---|---|
| DE | 10118620 A1 * | 1/2003 | | B62B 3/148 |
| JP | 2013151215 A * | 8/2013 | | |
| SU | 1178671 A1 * | 9/1985 | | |
| WO | WO-2009074699 A1 * | 6/2009 | | B62B 3/027 |

* cited by examiner

*Primary Examiner* — James A Shriver, II
*Assistant Examiner* — Michael T. Walsh

(57) ABSTRACT

A shopping cart assembly includes a shopping cart for carrying purchased items in a retail environment. The shopping cart has a cage and a bottom shelf. A ramp is hingedly coupled to the cage of the shopping cart and the ramp is positionable in an open position for extending into a vehicle thereby facilitating the purchased items to be slid along the ramp into the vehicle for loading the purchased items into the vehicle. A counterweight unit is coupled to the shopping cart and the counterweight unit is actuated when the ramp is positioned in the open position. The counterweight unit transfers counterweight to an opposite side of the shopping cart with respect to the ramp when the counterweight unit is actuated to inhibit the shopping cart from tipping when the purchased items are unloaded from the shopping cart.

12 Claims, 6 Drawing Sheets

US 11,214,290 B1

SHOPPING CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to shopping cart devices and more particularly pertains to a new shopping cart device that includes a ramp for assisting with loading purchased items in a vehicle.

(2) Description of Related Art Including Information Disclosed Under 37 CFR 1.97 and 1.98

The prior art relates to shopping cart devices including a variety of shopping carts that have a motorized conveyor belt for transporting purchased items out of the shopping cart. Additionally, the prior art discloses a shopping cart tilting mechanism for tipping a shopping cart to unload purchased items from the shopping cart.

BRIEF SUMMARY OF THE INVENTION

An embodiment of the disclosure meets the needs presented above by generally comprising a shopping cart for carrying purchased items in a retail environment. The shopping cart has a cage and a bottom shelf. A ramp is hingedly coupled to the cage of the shopping cart and the ramp is positionable in an open position for extending into a vehicle thereby facilitating the purchased items to be slid along the ramp into the vehicle for loading the purchased items into the vehicle. A counterweight unit is coupled to the shopping cart and the counterweight unit is actuated when the ramp is positioned in the open position. The counterweight unit transfers counterweight to an opposite side of the shopping cart with respect to the ramp when the counterweight unit is actuated to inhibit the shopping cart from tipping when the purchased items are unloaded from the shopping cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
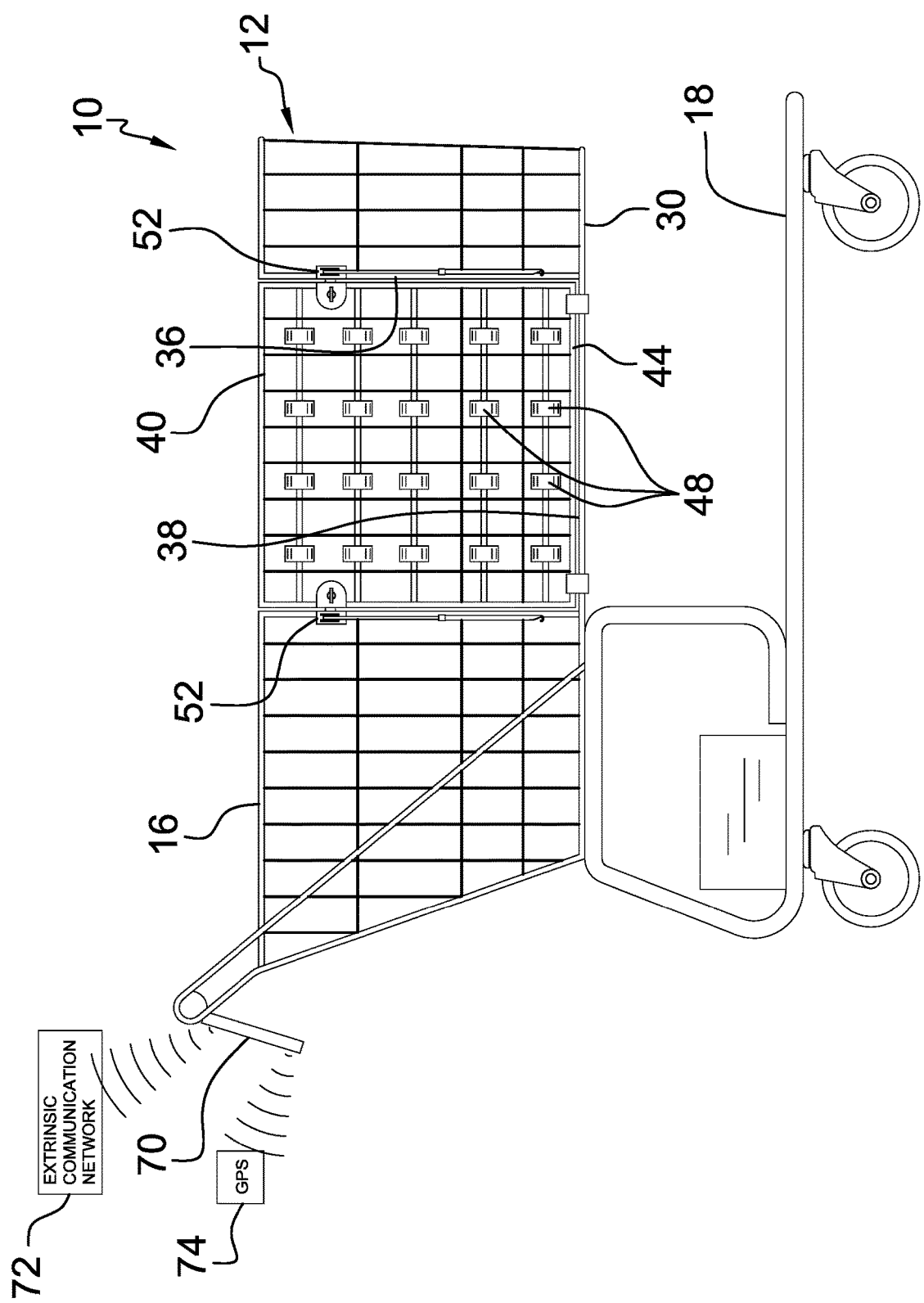
FIG. 1 is a right side view of a shopping cart assembly according to an embodiment of the disclosure.
Figure 2:
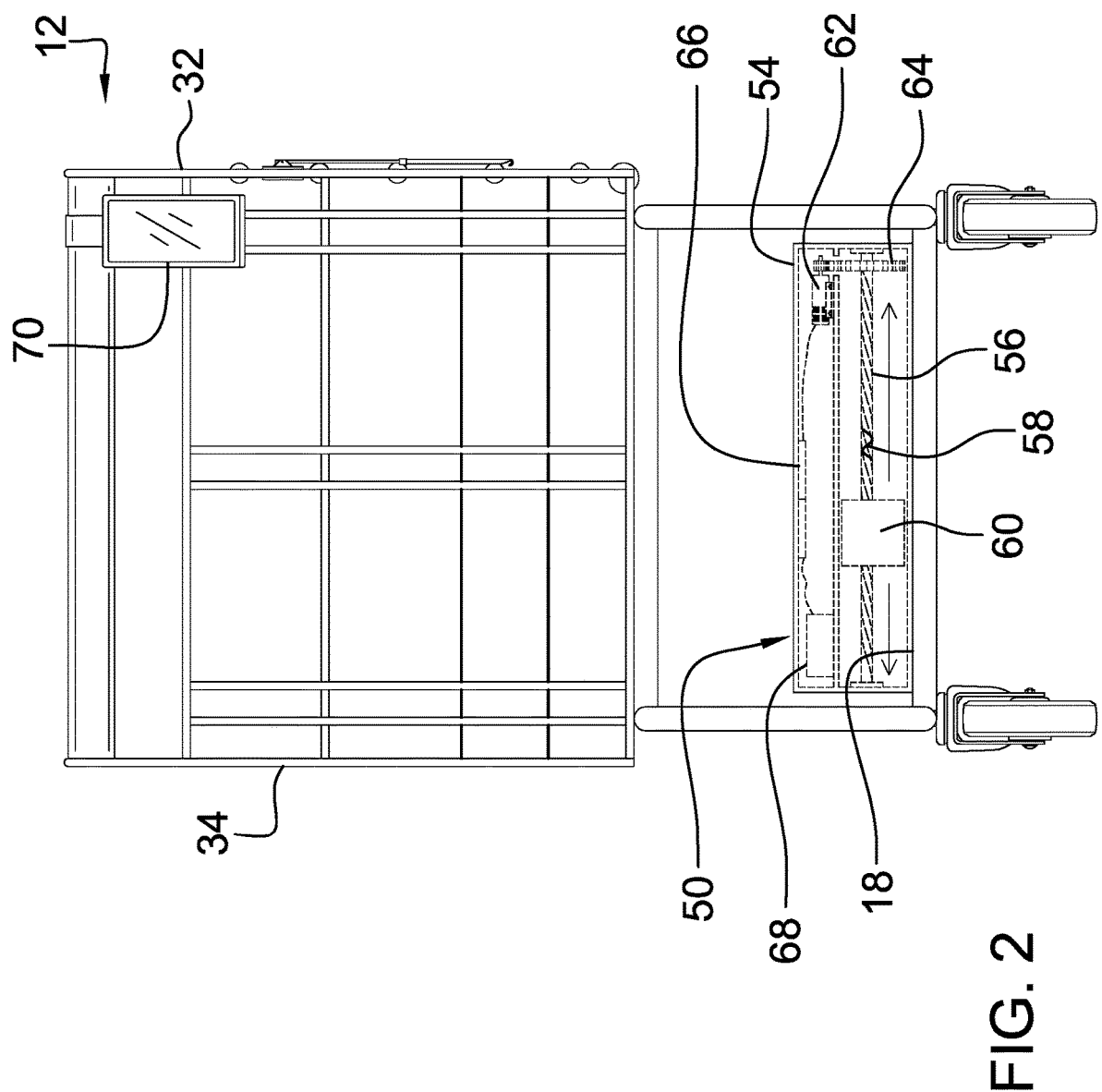
FIG. 2 is a back phantom view of an embodiment of the disclosure.
Figure 3:
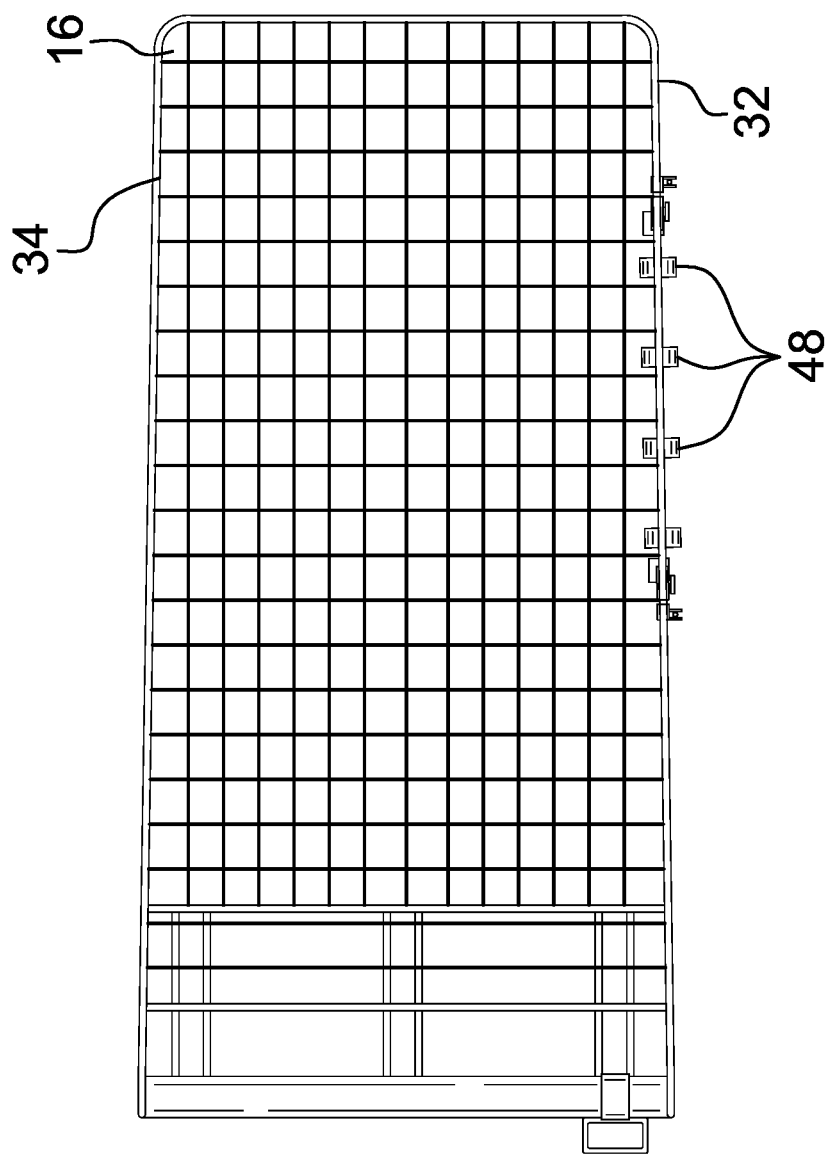
FIG. 3 is a top view of an embodiment of the disclosure.
Figure 4:
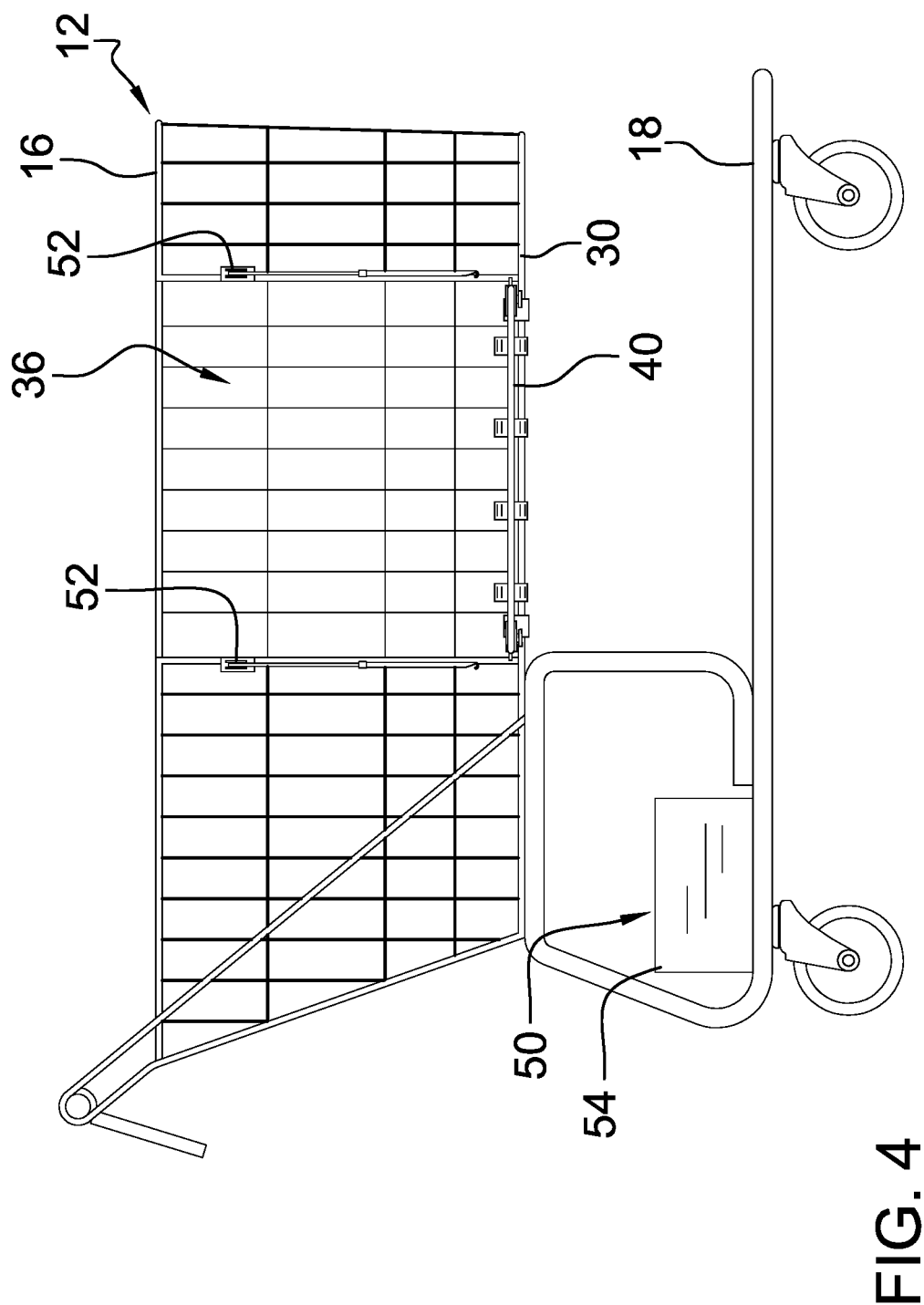
FIG. 4 is a right side view of an embodiment of the disclosure showing a ramp in an opened position.
Figure 5:
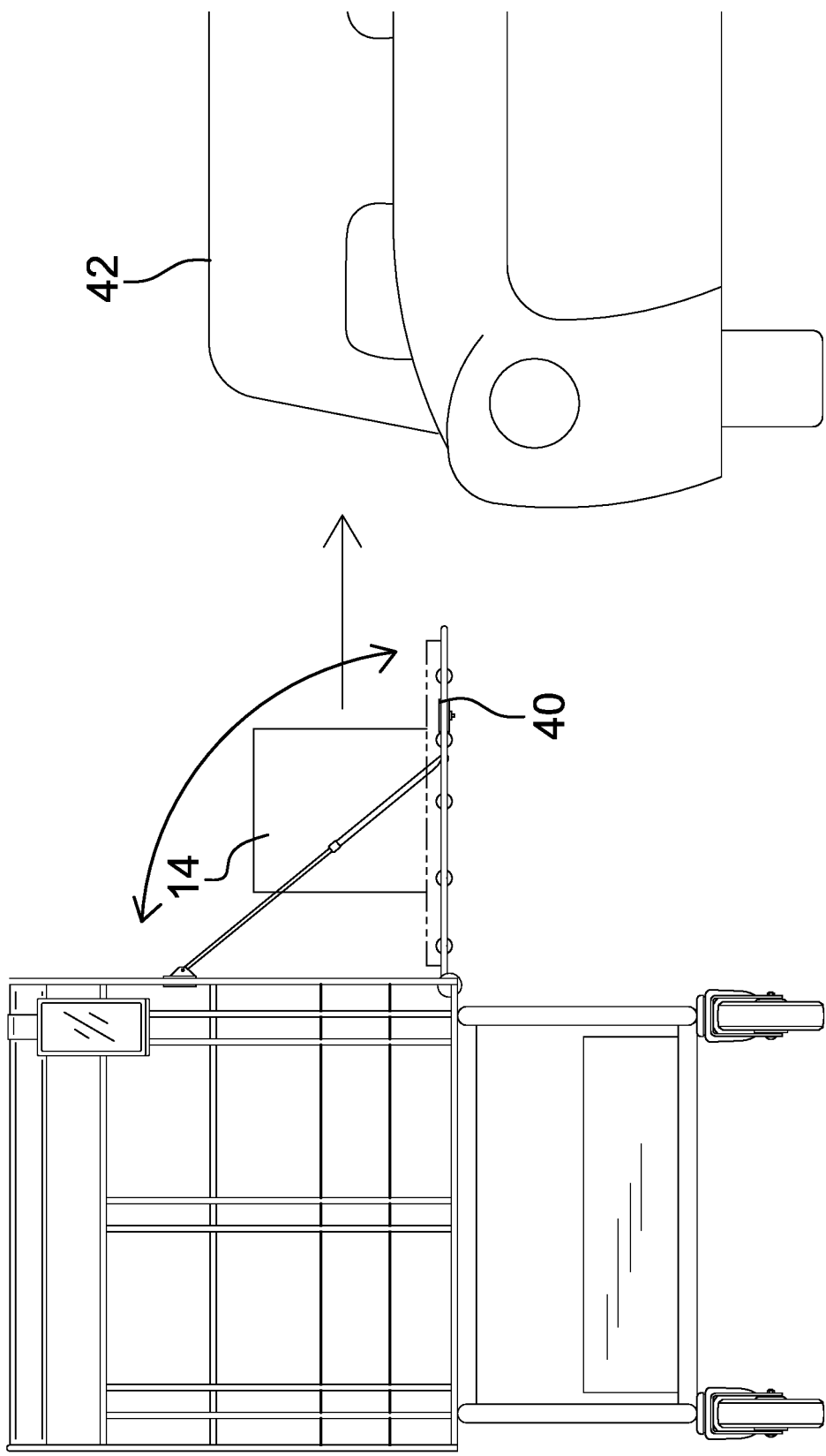
FIG. 5 is a back view of an embodiment of the disclosure showing a ramp in an opened position.
Figure 6:
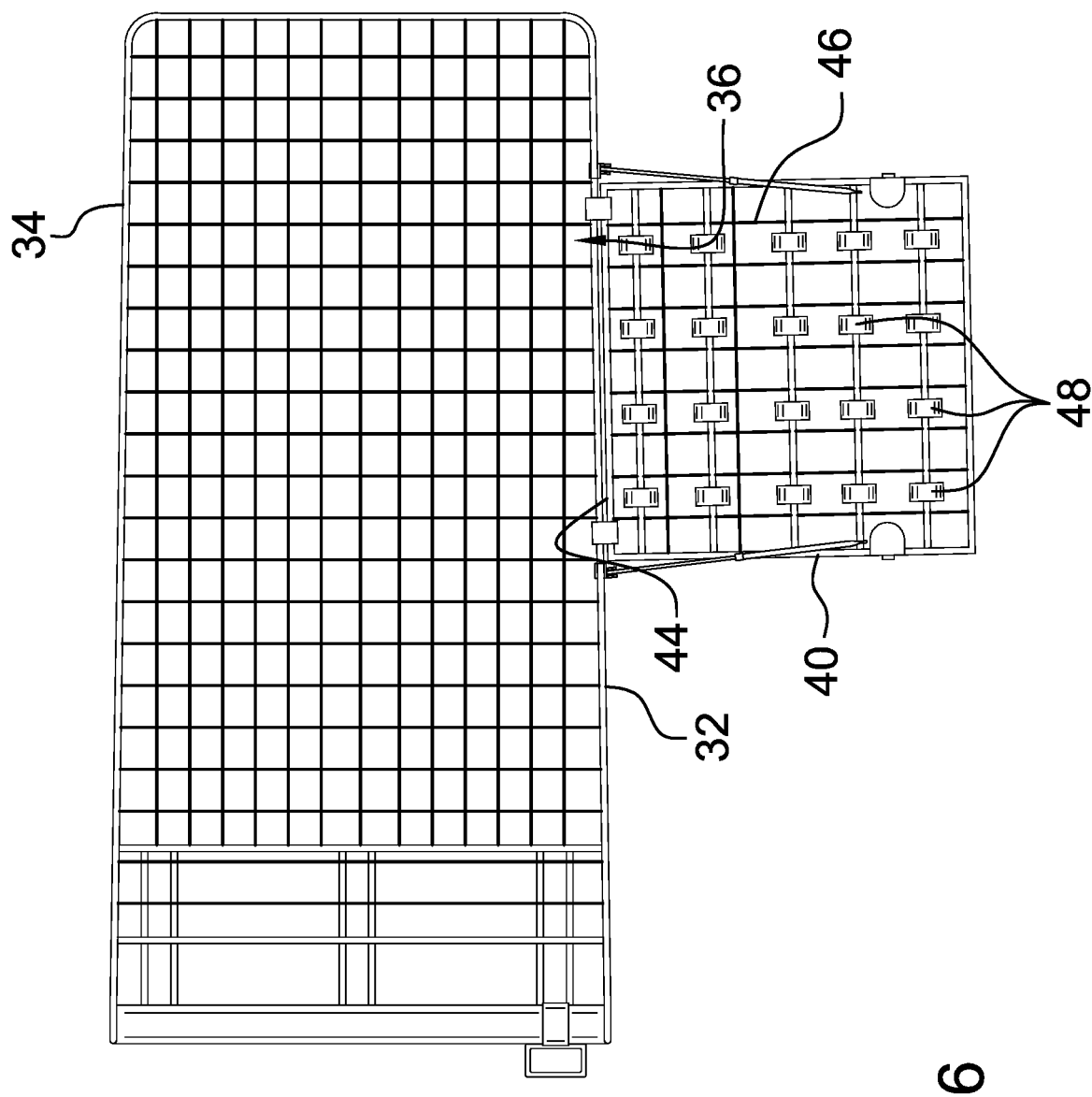
FIG. 6 is a top view of an embodiment of the disclosure showing a ramp in an opened position.

With reference now to the drawings, and in particular to FIGS. 1 through 6 thereof, a new shopping cart device embodying the principles and concepts of an embodiment of the disclosure and generally designated by the reference numeral 10 will be described.

As best illustrated in FIGS. 1 through 6, the shopping cart assembly 10 generally comprises a shopping cart 12 for carrying purchased items 14 in a retail environment. The shopping cart 12 has a cage 16 and a bottom shelf 18, and the cage 16 has a bottom side 30, a first lateral side 32 and a second lateral side 34. The first lateral side 32 has an opening 36 extending therethrough to have the purchased items 14 removed therethrough, and the opening 36 has a lower bounding edge 38. A ramp 40 is provided and the ramp 40 is hingedly coupled to the cage 16 of the shopping cart 12. The ramp 40 is positionable in a closed position to retain the purchased items 14 in the cage 16. Conversely, the ramp 40 is positionable in an open position having the ramp 40 sloping downwardly from the cage 16. In this way the ramp 40 can be extended into a vehicle 42 thereby facilitating the purchased items 14 to be slid along the ramp 40 into the vehicle 42 for loading the purchased items 14 into the vehicle 42.

The ramp 40 has a bottom edge 44 and a first side 46, and the bottom edge 44 is hingedly coupled to the lower bounding edge 38 of the opening 36 in the first lateral side 32 of the cage 16. The ramp 40 closes the opening 36 having the first side 46 facing into an interior of the cage 16 when the ramp 40 is in the closed position. The ramp 40 slopes downwardly from the first lateral side 32 of the cage 16 having the first side 46 facing upwardly when the ramp 40 is in the open position. A plurality of rollers 48 is each rollably attached to the ramp 40 to enhance rolling the purchased items 14 along the ramp 40 for loading the purchased items 14 into the vehicle 42. Each of the rollers 48 is positioned on the first side 46 of the ramp 40 and the rollers 48 are spaced apart from each other and are evenly distributed on the first side 46.

A counterweight unit 50 is coupled to the shopping cart 12 and the counterweight unit 50 is in communication with the ramp 40. The counterweight unit 50 is actuated when the ramp 40 is positioned in the open position. Moreover, the counterweight unit 50 transfers counterweight to an opposite side of the shopping cart 12 with respect to the ramp 40 when the counterweight unit 50 is actuated. In this way the counterweight unit 50 inhibits the shopping cart 12 from tipping when the purchased items 14 are unloaded from the shopping cart 12. The counterweight unit 50 centers the counterweight when the counterweight unit 50 is de-actuated, and the counterweight unit 50 is de-actuated when the ramp 40 is positioned in the closed position.

The counterweight unit 50 comprises a pair of switches 52 that is each coupled to the first lateral side 32 of the cage 16. Each of the switches 52 is aligned with the opening 36 in the first lateral side 32 of the cage 16. The ramp 40 engages each of the switches 52 when the ramp 40 is in the closed position. Conversely, the ramp 40 disengages each of the switches 52 when the ramp 40 is in the open position. Each of the switches 52 may comprise an electronic position switch, a micro switch or any other type of switch that can be turned on and off by the ramp 40.

The counterweight unit 50 includes a housing 54 that is positioned on the bottom shelf 18 of the shopping cart 12. The housing 54 extends between the first lateral side 32 and the second lateral side 34 of the cage 16. A screw 56 is rotatably integrated into the housing 54 such that the screw 56 is positioned within the housing 54. The screw 56 is oriented to extend along a horizontal axis and the screw 56 extends between the first lateral side 32 and the second lateral side 34 of the cage 16. Additionally, the screw 56 has an outer surface 58 that is threaded.

The counterweight unit 50 includes a counterweight 60 having the screw 56 extending therethrough. The counterweight 60 is urged toward the second lateral side 34 of the cage 16 when the screw 56 is rotated in a first direction to counter the weight of the purchased items 14 on the ramp 40. Conversely, the counterweight 60 is urged toward a center of the cage 16 when the screw 56 is rotated in a second direction. The counterweight unit 50 includes a motor 62 that is positioned in the housing 54 and the motor 62 is electrically coupled to the switches 52. The motor 62 rotates in a first direction when the switches 52 are disengaged and the motor 62 rotates in a second direction when the switches 52 are engaged.

The counterweight unit 50 includes a drive gear 64 that is positioned around the screw 56 and the motor 62 engages the drive gear 64. The drive gear 64 rotates the screw 56 in the first direction when the motor 62 rotates in the first direction. Conversely, the drive gear 64 rotates the screw 56 in the second direction when the motor 62 rotates in the second direction. The motor 62 may comprise an electric motor or the like.

A position sensor 66 is provided and the position sensor 66 is positioned in the housing 54. The position sensor 66 is electrically coupled to the motor 62 and the position sensor 66 senses the position of the counterweight 60 on the screw 56. The motor 62 is turned off when the position sensor 66 senses that the counterweight 60 is centered on the screw 56. Additionally, the motor 62 is turned off when the position sensor 66 senses that the counterweight 60 has been moved beneath the second lateral side 34 of the cage 16. The position sensor 66 may comprise a magnetic sensor, an optical sensor or any other type of electronic sensor that is capable of sensing the position of the counterweight 60 on the screw 56. The counterweight unit 50 includes a power supply 68 that is positioned in the housing 54, the power supply 68 is electrically coupled to the motor 62 and the power supply 68 comprises at least one battery.

An identification unit 70 is provided and the identification unit 70 is coupled to the shopping cart 12. The identification unit 70 has optical scanning capabilities such that the identification unit can scan a driver's license of a user of the shopping cart 12. Moreover, the identification unit 70 is in wireless communication with an extrinsic communication network 72 to verify the age and identity of the user of the shopping cart 12. The identification unit 70 is additionally in wireless communication with a global positioning system (gps) 74 to facilitate the shopping cart 12 to be remotely tracked if the shopping cart 12 is stolen. The identification unit 70 may include a radio frequency transceiver and the extrinsic communication network 72 may be a cellular phone network, the internet or other similar type of wireless communication network.

In use, the shopping cart 12 is positioned next to the vehicle 42 when to facilitate the purchased items 14 in the shopping cart 12 to be loaded into the vehicle 42. The ramp 40 is opened and the counterweight unit 50 transfers the counterweight 60 to the opposite side of the shopping cart 12 with respect to the ramp 40. The ramp 40 is positioned to extend into the vehicle 42 and the purchased items 14 are rolled down the ramp 40 into the vehicle 42. In this way the purchased items 14 can be loaded into the vehicle 42 without requiring the purchased items 14 to be lifted. The ramp 40 is closed when the purchased items 14 have been loaded into the vehicle 42 and the counterweight unit 50 centers the counterweight 60 on the shopping cart 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shopping cart assembly having a ramp integrated therein for assisting with unloading groceries into a vehicle, said assembly comprising:
   a shopping cart being configured for carrying purchased items in a retail environment, said shopping cart having a cage and a bottom shelf;

a ramp being hingedly coupled to said cage of said shopping cart, said ramp being positionable in a closed position wherein said ramp is configured to retain the purchased items in said cage, said ramp being positionable in an open position having said ramp sloping downwardly from said cage wherein said ramp is configured to be extended into a vehicle thereby facilitating the purchased items to be slid along said ramp into the vehicle for loading the purchased items into the vehicle;

a plurality of rollers, each of said rollers being rollably attached to said ramp wherein each of said rollers is configured to enhance rolling the purchased items along said ramp for loading the purchased items into the vehicle;

a counterweight unit being coupled to said shopping cart, said counterweight unit being in communication with said ramp, said counterweight unit being actuated when said ramp is positioned in said open position, said counterweight unit transferring counterweight to an opposite side of said shopping cart with respect to said ramp when said counterweight unit is actuated wherein said counterweight unit is configured to inhibit the shopping cart from tipping when the purchased items are unloaded from said shopping cart, said counterweight unit centering the counterweight when said counterweight unit is de-actuated, said counterweight unit being de-actuated when said ramp is positioned in said closed position.

2. The assembly according to claim 1, wherein said cage has a bottom side, a first lateral side and a second lateral side, said first lateral side having an opening extending therethrough wherein said opening is configured to have the purchased items removed therethrough, said opening having a lower bounding edge.

3. The assembly according to claim 2, wherein said ramp has a bottom edge and a first side, said bottom edge being hingedly coupled to said lower bounding edge of said opening in said first lateral side of said cage, said ramp closing said opening having said first side facing into an interior of said cage when said ramp is in said closed position, said ramp sloping downwardly from said first lateral side of said cage having said first side facing upwardly when said ramp is in said open position.

4. The assembly according to claim 2, wherein said counterweight unit includes a housing being positioned on said bottom shelf of said shopping cart, said housing extending between said first lateral side and said second lateral side of said cage.

5. The assembly according to claim 4, wherein said counterweight unit includes a screw being rotatably integrated into said housing such that said screw is positioned within said housing, said screw being oriented to extend along a horizontal axis, said screw extending between said first lateral side and said second lateral side of said cage, said screw having an outer surface being threaded.

6. The assembly according to claim 5, wherein said counterweigh unit includes a counterweight having said screw extending therethrough, said counterweight being urged toward said second lateral side of said cage when said screw is rotated in a first direction wherein said counterweight is configured to counter the weight of the purchased items on said ramp, said counterweight being urged toward a center of said cage when said screw is rotated in a second direction.

7. The assembly according to claim 6, wherein said counterweigh unit includes:

a pair of switches, each of said switches being coupled to said first lateral side of said cage, each of said switches being aligned with said opening in said first lateral side of said cage, said ramp engaging each of said switches when said ramp is in said closed position, said ramp disengaging each of said switches when said ramp is in said open position; and a motor being positioned in said housing, said motor being electrically coupled to said switches, said motor rotating in a first direction when said switches are disengaged, said motor rotating in a second direction when said switches are engaged, said motor being in mechanical communication with said screw.

8. The assembly according to claim 7, wherein said counterweight unit includes a drive gear being positioned around said screw, said motor engaging said drive gear, said drive gear rotating said screw in said first direction when said motor rotates in said first direction, said drive gear rotating said screw in said second direction when said motor rotates in said second direction.

9. The assembly according to claim 7, wherein said counterweight unit includes a position sensor being positioned in said housing, said position sensor being electrically coupled to said motor, said position sensor sensing the position of said counterweight on said screw, said motor being turned off when said position sensor senses that said counterweight is centered on said screw, said motor being turned off when said position sensor senses that said counterweight has been moved beneath said second lateral side of said cage.

10. The assembly according to claim 7, wherein said counterweight unit includes a power supply being positioned in said housing, said power supply being electrically coupled to said motor, said power supply comprising at least one battery.

11. The assembly according to claim 1, further comprising an identification unit, said identification unit being coupled to said shopping cart, said identification unit having optical scanning capabilities wherein said identification unit is configured to scan a driver's license of a user of said shopping cart, said identification unit being in wireless communication with an extrinsic communication network wherein said identification unit is configured to verify the age and identity of the user of said shopping cart, said identification unit being in wireless communication with a global positioning system (gps) wherein said identification unit is configured to facilitate said shopping cart to be remotely tracked if said shopping cart is stolen.

12. A shopping cart assembly having a ramp integrated therein for assisting with unloading groceries into a vehicle, said assembly comprising:

a shopping cart being configured for carrying purchased items in a retail environment, said shopping cart having a cage and a bottom shelf, said cage having a bottom side, a first lateral side and a second lateral side, said first lateral side having an opening extending therethrough wherein said opening is configured to have the purchased items removed therethrough, said opening having a lower bounding edge;

a ramp being hingedly coupled to said cage of said shopping cart, said ramp being positionable in a closed position wherein said ramp is configured to retain the purchased items in said cage, said ramp being positionable in an open position having said ramp sloping downwardly from said cage wherein said ramp is configured to be extended into a vehicle thereby facilitating the purchased items to be slid along said ramp into the vehicle for loading the purchased items into the vehicle, said ramp having a bottom edge and a first side, said bottom edge being hingedly coupled to said lower bounding edge of said opening in said first lateral side of said cage, said ramp closing said opening having said first side facing into an interior of said cage when said ramp is in said closed position, said ramp sloping downwardly from said first lateral side of said cage having said first side facing upwardly when said ramp is in said open position;

a plurality of rollers, each of said rollers being rollably attached to said ramp wherein each of said rollers is configured to enhance rolling the purchased items along said ramp for loading the purchased items into the vehicle, each of said rollers being positioned on said first side of said ramp, said rollers being spaced apart from each other and being evenly distributed on said first side;

a counterweight unit being coupled to said shopping cart, said counterweight unit being in communication with said ramp, said counterweight unit being actuated when said ramp is positioned in said open position, said counterweight unit transferring counterweight to an opposite side of said shopping cart with respect to said ramp when said counterweight unit is actuated wherein said counterweight unit is configured to inhibit the shopping cart from tipping when the purchased items are unloaded from said shopping cart, said counterweight unit centering the counterweight when said counterweight unit is de-actuated, said counterweight unit being de-actuated when said ramp is positioned in said closed position, said counterweight unit comprising:

a pair of switches, each of said switches being coupled to said first lateral side of said cage, each of said switches being aligned with said opening in said first lateral side of said cage, said ramp engaging each of said switches when said ramp is in said closed position, said ramp disengaging each of said switches when said ramp is in said open position;

a housing being positioned on said bottom shelf of said shopping cart, said housing extending between said first lateral side and said second lateral side of said cage;

a screw being rotatably integrated into said housing such that said screw is positioned within said housing, said screw being oriented to extend along a horizontal axis, said screw extending between said first lateral side and said second lateral side of said cage, said screw having an outer surface being threaded;

a counterweight having said screw extending therethrough, said counterweight being urged toward said second lateral side of said cage when said screw is rotated in a first direction wherein said counterweight is configured to counter the weight of the purchased items on said ramp, said counterweight being urged toward a center of said cage when said screw is rotated in a second direction;

a motor being positioned in said housing, said motor being electrically coupled to said switches, said motor rotating in a first direction when said switches are disengaged, said motor rotating in a second direction when said switches are engaged;

a drive gear being positioned around said screw, said motor engaging said drive gear, said drive gear rotating said screw in said first direction when said motor rotates in said first direction, said drive gear rotating said screw in said second direction when said motor rotates in said second direction;

a position sensor being positioned in said housing, said position sensor being electrically coupled to said motor, said position sensor sensing the position of said counterweight on said screw, said motor being turned off when said position sensor senses that said counterweight is centered on said screw, said motor being turned off when said position sensor senses that said counterweight has been moved beneath said second lateral side of said cage; and a power supply being positioned in said housing, said power supply being electrically coupled to said motor, said power supply comprising at least one battery; and an identification unit, said identification unit being coupled to said shopping cart, said identification unit having optical scanning capabilities wherein said identification unit is configured to scan a driver's license of a user of said shopping cart, said identification unit being in wireless communication with an extrinsic communication network wherein said identification unit is configured to verify the age and identity of the user of said shopping cart, said identification unit being in wireless communication with a global positioning system (gps) wherein said identification unit is configured to facilitate said shopping cart to be remotely tracked if said shopping cart is stolen.

\* \* \* \* \*